United States Patent
Yu et al.

(10) Patent No.: US 12,182,971 B2
(45) Date of Patent: Dec. 31, 2024

(54) IMAGE PROCESSING METHOD AND APPARATUS, STORAGE MEDIUM, AND ELECTRONIC DEVICE

(71) Applicant: TENCENT TECHNOLOGY (SHENZHEN) COMPANY LIMITED, Guangdong (CN)

(72) Inventors: Xiaoming Yu, Guangdong (CN); Yang Yi, Guangdong (CN); Feng Li, Guangdong (CN); Kaijie Cai, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 577 days.

(21) Appl. No.: 17/524,387

(22) Filed: Nov. 11, 2021

(65) Prior Publication Data
US 2022/0067888 A1     Mar. 3, 2022

Related U.S. Application Data

(63) Continuation of application No. PCT/CN2020/094576, filed on Jun. 5, 2020.

(30) Foreign Application Priority Data

Nov. 26, 2019   (CN) .......................... 201911175754.X

(51) Int. Cl.
*G06T 5/70* (2024.01)
*G06N 3/08* (2023.01)
(Continued)

(52) U.S. Cl.
CPC ................ *G06T 5/70* (2024.01); *G06N 3/08* (2013.01); *G06T 5/50* (2013.01); *G06V 10/25* (2022.01); *G06V 10/26* (2022.01); *G06V 40/16* (2022.01)

(58) Field of Classification Search
CPC ... G06T 5/70; G06T 5/50; G06T 2207/20012; G06N 3/08; G06N 3/045; G06V 10/25;
(Continued)

(56) References Cited

U.S. PATENT DOCUMENTS

2019/0089910 A1\*   3/2019   Banik ....................... G06T 5/77
2019/0311186 A1    10/2019   Chen
(Continued)

FOREIGN PATENT DOCUMENTS

CN       107508031 A      12/2017
CN       108509994 A       9/2018
(Continued)

OTHER PUBLICATIONS

International Search Report & Written Opinion issued Sep. 9, 2020 in International Application No. PCT/CN2020/094576, with English translation, 10 pgs.

(Continued)

*Primary Examiner* — Phuoc Tran
(74) *Attorney, Agent, or Firm* — ArentFox Schiff LLP

(57) ABSTRACT

A plurality of groups of portrait components and a region in which the plurality of groups of portrait components are located are recognized from a first image, each group of portrait components corresponding to one human body, and a target region that includes a human face is determined in the region in which the plurality of groups of portrait components are located, to blur regions other than the target region in the first target image. A target group of portrait components including the human face is recognized from the first image, so that the target region in which the target group of portrait components is located is determined as a foreground region, and limbs of other people without a human face are determined as a background region. The disclosed system and method improve the accuracy of (Continued)

recognizing a foreground person and reducing incorrect detection in portrait recognition.

20 Claims, 7 Drawing Sheets

(51) Int. Cl.
  *G06T 5/50* (2006.01)
  *G06V 10/25* (2022.01)
  *G06V 10/26* (2022.01)
  *G06V 40/16* (2022.01)

(58) Field of Classification Search
  CPC ........ G06V 10/26; G06V 40/16; G06V 10/82; G06V 40/161; G06V 40/10
  See application file for complete search history.

(56) References Cited

U.S. PATENT DOCUMENTS

| | | | |
|---|---|---|---|
| 2020/0082535 A1* | 3/2020 | Lindskog | G06V 40/161 |
| 2021/0150676 A1* | 5/2021 | Sytnik | G06T 5/73 |

FOREIGN PATENT DOCUMENTS

| | | |
|---|---|---|
| CN | 109410220 A | 3/2019 |
| CN | 110991298 A | 4/2020 |

OTHER PUBLICATIONS

Chinese Office Action issued Mar. 11, 2023 in Application No. 201911175754.X, with English Translation (26 pages).

Gong, Ke, Xiaodan Liang, Yicheng Li, Yimin Chen, Ming Yang, and Liang Lin. "Instance-level human parsing via part grouping network." In Proceedings of the European conference on computer vision (ECCV), pp. 770-785. 2018.

* cited by examiner

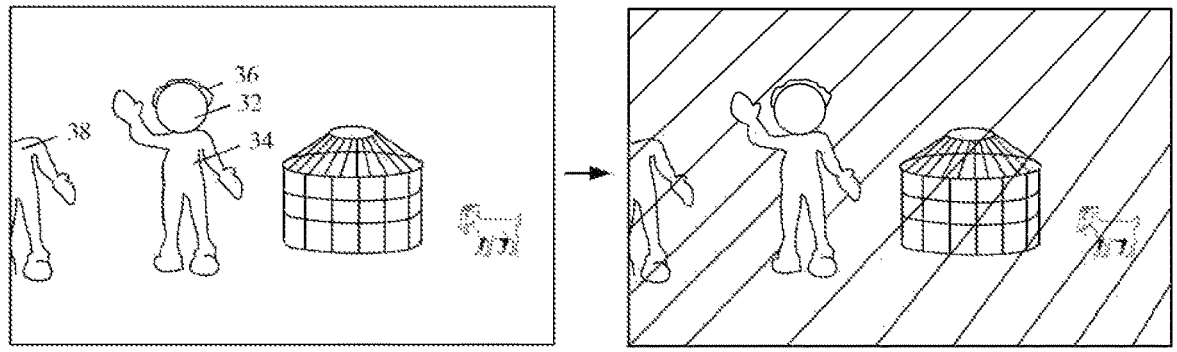

FIG. 3

```
Input a to-be-processed first target image into a recognition model, to obtain
a portrait recognition result outputted by the recognition model, the
recognition model being configured to recognize a portrait component in an     S402
image, the portrait recognition result being used for representing the portrait
component recognized from the first target image
                                    ↓
Determine a target connected region in a region in which the portrait
component is located in the first target image, the target connected region    S404
including a region in which a human face in the portrait component is
located in the first target image
                                    ↓
Blur regions other than the target connected region in the first target image, S406
to obtain a second target image
```

FIG. 4

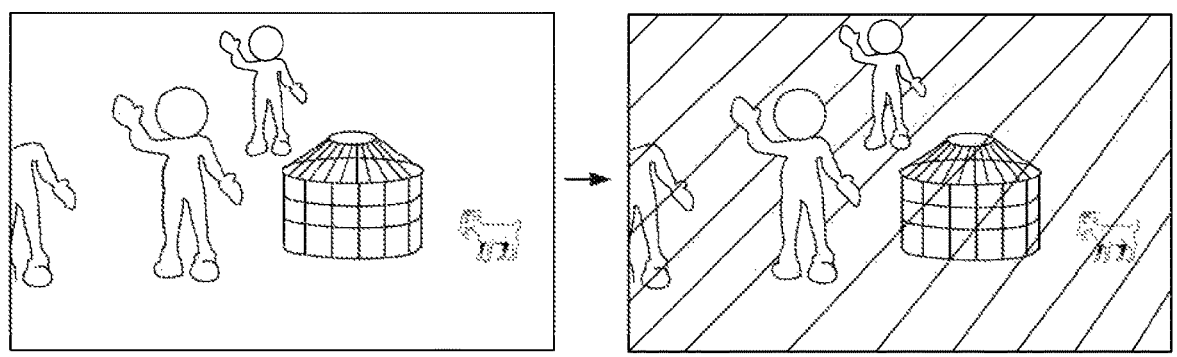

FIG. 5

IMAGE PROCESSING METHOD AND APPARATUS, STORAGE MEDIUM, AND ELECTRONIC DEVICE

RELATED APPLICATIONS

This application is a continuation of International Application No. PCT/CN2020/094576, filed on Jun. 5, 2020, which claims priority to Chinese Patent Application No. 201911175754.X, entitled "IMAGE PROCESSING METHOD AND APPARATUS, STORAGE MEDIUM, AND ELECTRONIC DEVICE" and filed on Nov. 26, 2019. The disclosures of the prior applications are hereby incorporated by reference in their entirety.

FIELD OF THE TECHNOLOGY

This application relates to the field of artificial intelligence (AI), including an image processing technology.

BACKGROUND OF THE DISCLOSURE

In the related art, regions in an image are simply defined as a portrait foreground and a non-portrait background. When the image includes a plurality of people, it is usually difficult to accurately recognize a foreground person in the image in the related art. A portrait with only partial limbs in the image is often recognized as a foreground, resulting in incorrect detection in the recognition of a foreground portrait.

SUMMARY

Embodiments of this application provide an image processing method and apparatus, a storage medium, and an electronic device, so that a foreground person in an image can be accurately recognized, thereby avoiding incorrect detection of a foreground person.

In an embodiment, an image processing method includes recognizing, from a first image, a plurality of groups of portrait components and a region in which the plurality of groups of portrait components are located, each group of portrait components corresponding to one human body. The method further includes determining, by processing circuitry of an electronic device, in the region in which the plurality of groups of portrait components are located, a target region in which a target group of portrait components is located, the target group of portrait components comprising a target human face, the target region being separated from regions in which other groups of portrait components other than the target group of portrait components are located, and blurring regions of the first image oilier than the target region, to obtain a second image.

In an embodiment, an image processing apparatus includes processing circuitry configured to recognize, from a first image, a plurality of groups of portrait components and a region in which the plurality of groups of portrait components are located, each group of portrait components corresponding to one human body. The processing circuitry is further configured to determine, in the region in which the plurality of groups of portrait components are located, a target region in which a target group of portrait components is located, the target group of portrait components comprising a target human face, the target region being separated from regions in which other groups of portrait components other than the target group of portrait components are located, and blur regions of the first image other than the target region, to obtain a second image.

In a non-limiting embodiment, a non-transitory computer-readable storage medium stores computer-readable instructions thereon, which, when executed by a processor, cause the processor to perform an image processing method. The image processing method includes recognizing, from a first image, a plurality of groups of portrait components and a region in which the plurality of groups of portrait components are located, each group of portrait components corresponding to one human body. The image processing method further includes determining in the region in which the plurality of groups of portrait components are located, a target region in which a target group of portrait components is located, the target group of portrait components comprising a target human face, the target region being separated from regions in which other groups of portrait components other than the target group of portrait components are located, and blurring regions of the first image other than the target region, to obtain a second image.

In the embodiments of this application, a plurality of groups of portrait components and a region in which the plurality of groups of portrait components are located are recognized from a to-be-processed first target image, each group of portrait components corresponding to one human body, and a target region that includes a human face is determined in the region in which the plurality of groups of portrait components are located, to blur regions other than the target region in the first target image, that is, to recognize a target group of portrait components including the human face from the first target image, so that the target region in which the target group of portrait components is located is determined as a foreground region, and limbs of other people without a human face are determined as a background region, thereby achieving the technical effects of improving the accuracy of recognizing a foreground person and reducing incorrect detection in portrait recognition.

BRIEF DESCRIPTION OF THE DRAWINGS

The accompanying drawings described herein are used to provide a further understanding of this application, and form part of this application. Exemplary embodiments of this application and descriptions thereof are used to explain this application. In the accompanying drawings:

FIG. 3 is a schematic diagram of an image under image processing in an image processing method according to an embodiment of this application.

FIG. 4 is a schematic flow chart of another image processing method according to an embodiment of this application.

FIG. 5 is a schematic diagram of an image under image processing in another image processing method according to an embodiment of this application.

DESCRIPTION OF EMBODIMENTS

In order to make a person skilled in the art better understand the solutions of this application, the following clearly describes the technical solutions in the embodiments of this application with reference to the accompanying drawings in the embodiments of this application. The described embodiments are only some of the embodiments of this application rather than all of the embodiments. All other embodiments obtained by a person of ordinary skill in the art based on the embodiments of this application shall fall within the protection scope of this application.

In this specification, claims, and accompanying drawings of this application, the terms "first", "second", and so on are intended to distinguish similar objects but do not necessarily indicate a specific order or sequence. It is to be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Machine learning (ML) is a multi-field interdiscipline, and relates to a plurality of disciplines such as the probability theory, statistics, approximation theory, convex analysis, and algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations. In the embodiments of this application, training with machine learning may be used to obtain a recognition model configured to recognize a portrait component in an image, so that a recognition network is used to recognize an inputted portrait component in an image, and a connected region in which a portrait component including a human face is located is determined as a foreground region, and limbs of other people without a human face can be determined as a background image, thereby achieving the technical effects of improving the accuracy of recognizing a foreground person and reducing incorrect detection in portrait recognition.

Figure 1:
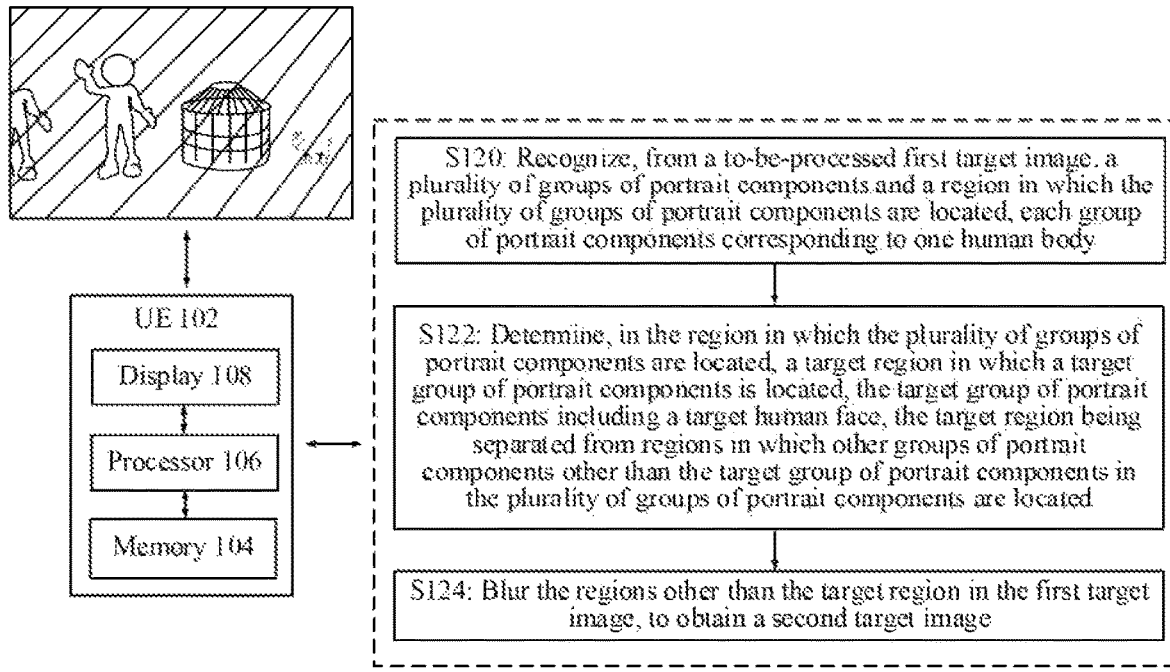
FIG. 1 is a schematic diagram of an application environment of an image processing method according to an embodiment of this application.

According to an aspect of the embodiments of this application, an image processing method is provided. In an implementation, the image processing method may be applied to, but not limited to, the environment shown in FIG. 1.

The image processing method in the embodiments of this application may be used to process a static image such as a photo, to blur background regions other than a portrait in the image, and may be further configured to process a video frame image in a video, to blur background regions other than a portrait in the video frame image. Background blur is performed on each frame image in the video, so that regions other than a foreground portrait in the video are in a blurred state. The video may be video data generated in a video conference. The application of the image processing method in the embodiments of this application is not limited to the foregoing example.

User equipment (UE) 102 may use a processor 106 (processing circuitry) to perform the following steps. In step S120, a plurality of groups of portrait components and a region in which the plurality of groups of portrait components are located are recognized, from a to-be-processed first target image (first image). Each group of portrait components corresponds to one human body. The portrait components may include hair, a human face, a trunk or the like.

In step S122, a target region in which a target group of portrait components is located is determined within the region in which the groups of portrait components are located. The target group of portrait components includes a target human face, and the target region being separated from regions in which other groups of portrait components other than the target group of portrait components in the plurality of groups of portrait components are located. Portrait components such as hair, a human face, and a trunk that belong to the same portrait in an image are connected to each other. Therefore, in response to a determination that there is a portrait in the first target image, at least one connected region may be determined. Mam people in a photo or video all show the faces. Therefore, a connected region including a region in which a human face is located may be determined as a target connected region, that is, a foreground region in the first target image.

In step S124, the regions other than the target region in the first target image are blurred, to obtain a second target image (second image). Regions other than the target region are determined as background regions in the first target image, and the background regions are blurred, to obtain the processed second target image. In the embodiments of this application, the portrait components in the first target image are recognized, and a connected region including a human face is determined as a foreground region, so that regions in which other groups of portrait components without a human face are located can be determined as background images, thereby achieving the technical effects of improving the accuracy of recognizing a foreground person and reducing incorrect detection in portrait recognition. The UE 102 may use a memory to store the first target image and the second target image and use a display 108 to display the first target image and the processed second target image.

Further, in this embodiment, the foregoing image processing method may be performed by, but not limited to, the UE 102. Alternatively, an application (APP) may further blur the background regions in the image. The foregoing APP may be run on, but not limited to, the UE 102. The UE 102 may be, but not limited to, a terminal device such as a mobile phone, a tablet computer, a notebook computer or a personal computer (PC) that can run the APP.

The foregoing image processing method may be performed by a server. The server is configured to assist in blurring the background regions in the image, and transmit the processed second target image to the UE 102. The server and the UE 102 may perform, but not limited to, data exchange with each other through a network, and the network may include, but not limited to, a wireless network or a wired network. The wireless network includes: Bluetooth, Wi-Fi, and another network implementing wireless communication. The wired network may include, but not limited to, a wide area network, a metropolitan area network, and a local area network. The foregoing description is merely an example, which is not limited in this embodiment.

Figure 2:
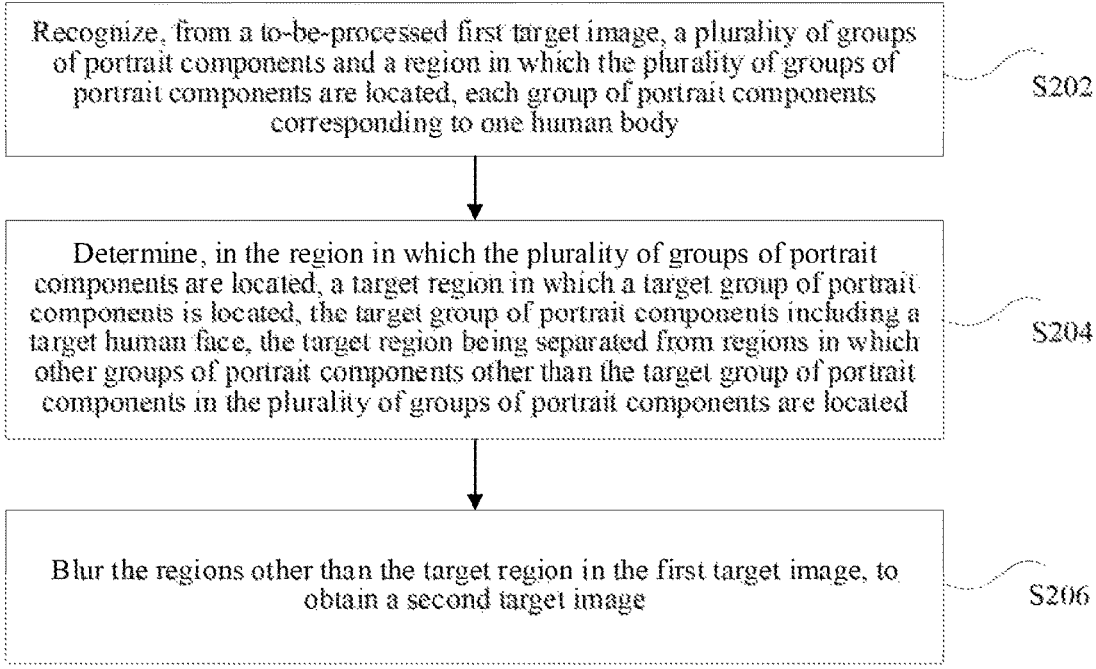
FIG. 2 is a schematic flowchart of an image processing method according to an embodiment of this application.

In an implementation, the image processing method provided in the embodiments of this application may be performed by an electronic device (for example, UE or a server). As shown in FIG. 2, the foregoing image processing method includes the following steps.

In Step 202, a plurality of groups of portrait components and a region in which the plurality of groups of portrait components are located are recognized, from a to-be-processed first target image, each group of portrait components corresponding to one human body.

In Step 204, a target region in which a target group of portrait components is located is determined, in the region in which the plurality of groups of portrait components are located, the target group of portrait components including a target human face, the target region being separated from regions in which other groups of portrait components other than the target group of portrait components in the plurality of groups of portrait components are located.

In Step 206, the regions other than the target region in the first target image are blurred, to obtain a second target image.

In the embodiments of this application, a portrait component in a target image may be first recognized by using a recognition model. The portrait component may include, but not limited to, a human face, hair, and a trunk. As shown in FIG. 3, after the first target image is inputted into the recognition model, the recognition model may recognize a portrait component 32 being a human face, portrait components 34 and 38 being trunks, and a portrait component 36 being hair in the first target image. Recognizable portrait components are examples, and this application is not limited thereto.

In the embodiments of this application, because the background regions other than the portrait need to be blurred, as shown in FIG. 3, the image includes a plurality of portrait components. Regions in which these portrait components are located are portrait regions. Regions in which connected portrait components are located are portrait regions. Another portrait, for example, a portrait corresponding to the portrait component 38 shown in FIG. 3, may be mistakenly acquired in a process of image acquisition such as photographing. However, it is clearly not appropriate to determine such a portrait with only a trunk as a foreground.

In the embodiments of this application, a group of portrait components including a human face may be determined as a target group of portrait components, and a region in which the target group of portrait components is located is determined as a target region, so that the target region is determined as the foreground region in the first target image, regions other than the target region in the first target image are determined as background regions, and the background regions are blurred, to obtain the processed second target image. As shown in FIG. 3, for a region corresponding to the portrait component 38 being a trunk, because the region does not include a portrait component with a human face, the region needs to be blurred. Pans covered by oblique lines in FIG. 3 are used to illustrate that these regions are blurred, so that limbs of other people without a human face can be determined as background regions, thereby achieving the technical effects of improving the accuracy of recognizing a foreground person and reducing incorrect detection in portrait recognition, and resolving the technical problem of incorrect detection in portrait recognition caused by inaccurate recognition of a foreground person.

In this embodiment, a group of portrait components may include some or all components corresponding to one human body. For example, three components, namely, the face, arm, and hand of an object S may form a group of portrait components, and the group of portrait components correspond to the object S.

The target region is separated from regions in which other groups of portrait components other than the target group of portrait components in the plurality of groups of portrait components are located. For example, a group of portrait components corresponds to the object S is the target region, and the target region is not connected to regions in which other objects are located in the first target image.

Further, in this embodiment, step S204 of determining, in the region in which the plural groups of portrait components are located, a target region in which a target group of portrait components is located includes the following steps.

In step S1, M groups of portrait components including a human face are determined from N groups of portrait components, the N groups of portrait components being the plurality of groups of portrait components recognized from the first target image, N≥M≥1.

In step S2 in a region in which the M groups of portrait components are located, the target region in which the target group of portrait components is located is determined, an area of a region in which the human face included in the target group of portrait components is located being greater (larger) than or equal to a first threshold, and/or, an area of the region in which the target group of portrait components being greater (larger) than or equal to a second threshold.

For example, the trunk of an object A, the human face of the object A, and two arms of the object A are recognized from an image, to form a group of portrait components corresponding to the object A. The trunk of an object B is recognized to form a group of portrait components corresponding to the object B. The trunk of an object C the human face of the object C. and one arm of the object C are recognized to form a group of portrait components corresponding to the object C. That is, there are three groups of portrait components in the image. Two groups of portrait components include a human face. The target region in which the target group of portrait components is located is determined from the two groups of portrait components. A manner of determining includes one of the following methods.

In method 1, it is determined whether an area of a region in which a human face included in each group of portrait components is located is greater than or equal to the first threshold. If yes, it may be determined that the group of portrait components is the target group of portrait components, and the region in which the target group of portrait components is located is the target region. In an image, when an object M is located in front of an object N, a human face area of the object N is less than a human face area of the object M in the image. For example, in the image, the human face area of the object M is 3 square centimeters, and the human face area of the object N is 2 square centimeters. Assuming that the first threshold is 3 square centimeters, only the object M satisfies the condition, and a group of portrait components corresponding to the object M may be used as the target group of portrait components.

In method 2, it is determined whether an area of a region in which each group of portrait components is located is greater than or equal to the second threshold. If yes, it may be determined that the group of portrait components is the target group of portrait components, and the region in which the target group of portrait components is located is the target region. For example, the human face area of the object M is 3 square centimeters, and the region in which the trunk and arms are located is 5 square centimeters. The human face area of the object N is 2 square centimeters, and the region in which the trunk and arms are located is 10 square centimeters. Assuming that the second threshold is 8 square centimeters, both the object M and the object N satisfy the condition, and a group of portrait components corresponding to the object M and a group of portrait components corresponding to the object N may both be used as target portrait components.

In the embodiments of this application, the target group of portrait components may be determined in the foregoing method 1 and method 2 at the same time. Thai is, for a group of portrait components, when an area of a region in which a human face is located is greater than or equal to the first threshold and an area of a region in which a group of portrait components is located is greater than or equal to the second threshold, the region in which the human face is located is determined as a target group of portrait components.

In this embodiment, the first threshold and/or the second threshold is positively correlated to a size of the first target image. That is, in a case that areas of regions in which a human face is located included in M groups of portrait components are compared with the first threshold, the first threshold used as a reference is positively correlated to a size of the first target image. In a case that areas of regions in which the M groups of portrait components are located are compared with the second threshold, the second threshold used as a reference is positively correlated to the size of the first target image. In a case that areas of regions in which a human face is located included in the M groups of portrait components are compared with the first threshold and areas of regions in which the M groups of portrait components are located are compared with the second threshold, the first threshold and the second threshold that are used as references are both positively correlated to the size of the first target image. The positive correlation may include, but not limned to, a direct ratio relationship or an exponential relationship.

Further, the determining, in a region in which the M groups of portrait components are located, the target region in which the target group of portrait components is located includes the following steps.

In step S1, pixel values of pixels corresponding to the M groups of portrait components are set to a first pixel value, and pixel values of pixels other than the pixels corresponding to the M groups of portrait components in the first target image are set to a second pixel value, to obtain a binary image, the first pixel value being different from the second pixel value; and In step S2, a region recognition is performed on the binary image, to obtain the target region, the target region including pixels of the target human face.

Further, in this embodiment, the recognizing, from a to-be-processed first target image, a plurality of groups of portrait components and a region in which the plurality of groups of portrait components are located includes processing the first target image by using a recognition model, and determining the plurality of groups of portrait components and the region in which the plurality of groups of portrait components are located.

Further, in this embodiment, before the processing the first target image by using a recognition model, and determining the plurality of groups of portrait components and the region in which the plurality of groups of portrait components are located, the method includes the following steps.

In step S1, a first group of training images, a second group of training images, a group of region division results, and a group of training recognition results are acquired, the first group of training images corresponding one to one to the group of region division results, each region division result representing a known portrait region in an image in the first group of training images, the second group of training images corresponding one to one to the group of training recognition results, each training recognition result representing a known portrait component in an image in the second group of training images.

In step S2, an initial recognition model is trained based on the first group of training images and the second group of training images, to obtain a trained recognition model, an error between an estimated portrait region recognized from the first group of training images by using the trained recognition model and the known portrait region in the group of region division results satisfying a first convergence condition, an error between an estimated portrait component recognized from the second group of training images by using the trained recognition model and the known portrait component in the group of training recognition results satisfying a second convergence condition, the trained recognition model including: an encoding network configured to encode an image to obtain encoded data, a portrait region recognition network configured to recognize a portrait region according to the encoded data, and a portrait component recognition network configured to recognize a portrait component according to the encoded data.

The training an initial recognition model based on the first group of training images and the second group of training images includes selecting a first training image from the first group of training images, and selecting a second training image from the second group of training images; inputting the first training image and the second training image into the initial recognition model, the initial recognition model including an initial encoding network, an initial portrait region recognition network, and an initial portrait component recognition network, the initial encoding network including cascaded first convolutional layers, the initial portrait region recognition network including cascaded second convolutional layers, the initial portrait component recognition network including cascaded third convolutional layers; and receiving, by a first convolutional layer in the initial encoding network, encoded data obtained after a cascaded previous first convolutional layer encodes the first training image and the second training image, and transmitting the encoded data to a corresponding second convolutional layer, third convolutional layer, and cascaded next first convolutional layer; receiving, by the initial portrait region recognition network, encoded data transmitted by a corresponding first convolutional layer and cascaded previous second convolutional layer, and performing a portrait region recognition on the received encoded data; and receiving, by the initial portrait component recognition network, encoded data transmitted by a corresponding first convolutional layer and cascaded previous third convolutional layer, and performing a portrait component recognition on the received encoded data.

In the embodiments of this application, a plurality of groups of portrait components and a region in which the plurality of groups of portrait components are located are recognized from a to-be-processed first target image, each group of portrait components corresponding to one human body, and a target region that includes a human face and in which the target group of portrait components are located is determined in the region in which the plurality of groups of portrait components are located, to blur regions other than the target region in the first target image, that is, to recognize a target group of portrait components including the human face from the first target image, so that the target region in which the target group of portrait components is located is determined as a foreground region, and regions that do not include a human face and in which other groups of portrait components are located are determined as background regions, thereby improving the accuracy of recognizing a foreground person and reducing incorrect detection in portrait recognition.

In an embodiment, in response to a determination that the first target image is a video frame image in a target video, after the blurring the regions other than the target region in the first target image, to obtain a second target image, the method further includes: replacing the first target image in the target video with the second target image; and playing the second target image in a process of playing the target video. In this way, a picture in a video is blurred.

In another implementation, as shown in FIG. 4, the foregoing image processing method includes the following steps.

In step S402, a to-be-processed first target image (first linage) is input into a recognition model, to obtain a portrait recognition result outputted by the recognition model, the recognition model being configured to recognize a portrait component in an image, the portrait recognition result representing the portrait component recognized from the first target image.

In step S404, a target connected region is determined in a region in which the portrait component is located in the first target image, the target connected region including a region in which a human face in the portrait component is located in the first target image.

In step S406, regions other than the target connected region in the first target image are blurred, to obtain a second target image.

In the embodiments of this application, die recognition model may recognize portrait components in an inputted image. The portrait components may include, but are not limited to, a human face, hair, and a trunk. As shown in FIG. 3, after the first target image is inputted into the recognition model, a portrait component 32 being a human face, portrait components 34 and 38 being trunks, and a portrait component 36 being hair may be recognized from the image. Recognizable portrait components are examples, and this application is not limited thereto.

In the embodiments of this application, because background regions other than a portrait in the image need to be blurred, as shown in FIG. 3, the image includes a plurality of portrait components. A region obtained by connecting regions in which the plurality of connected portrait components are located is a portrait region. Another portrait, for example, a portrait corresponding to the portrait component 38 shown in FIG. 3, may be mistakenly acquired in a process of image acquisition such as photographing. However, it is clearly not appropriate to determine such a portrait with only a trunk as a foreground.

In the embodiments of this application, a connected region formed by portrait components including a human face is determined as a target connected region, the target connected region is determined as a foreground region, regions other than the target connected region in the first target image are determined as background regions, and the background regions other than the target connected region are blurred, to obtain the processed second target image (second image). As shown in FIG. 3, for a connected region in which the portrait component 38 being a trunk is located, because the region does not include a portrait component with a human face, the region is also blurred. Parts covered by oblique lines m FIG. 3 are used to illustrate that these regions are blurred. In this way, limbs of other people without a human face can be determined as background regions, thereby achieving the technical effects of improving the accuracy of recognizing a foreground person and reducing incorrect detection in portrait recognition.

Further, the determining a target connected region in a region in which the portrait component is located in the first target image includes the following steps.

In step S1, every connected region in regions in which portrait components are located in the first target image is determined as one candidate connected region, to obtain a group of candidate connected regions.

Assuming that one portrait in the image includes hair, a human face, and a trunk, regions in which these portrait components are located are connected to each other. The "connected to each other" may be direct connection or may be indirect connection. For example, the region in which the portrait component corresponding to the hair is located may be connected to the region in which the portrait component corresponding to the mink by the region in which the portrait component corresponding to the human face is located. As shown in FIG. 3, a region in which the portrait component 36 is located may be connected to a region in which the portrait component 34 is located by a region in which the portrait component 32 is located.

During the recognition of a portrait component in the first target image by using the recognition model, a region in which a human face is located, a region in which the trunk is located, and the like in the image may be recognized. Pixels in regions in which the recognized portrait components are located are marked. During the determination of a connected region, a connected region in which pixels having a first type mark are located in the image may be determined as one candidate connected region. Pixels in one connected region have the first type mark. The same mark may be used for different portrait components, or a preconfigured corresponding mark may be used for different portrait components. In another example, pixels in connected regions in which portrait components are located may be set to a target pixel value, so that connected regions in which the target pixel value is located are determined as candidate connected regions. Pixels in one candidate connected region all have the target pixel value. In response to a determination that there are plural portraits in the image, a plurality of candidate connected regions may be determined.

In step S2, a candidate connected region is determined that has a region area greater than a first threshold and includes a human face in the group of candidate connected regions as the target connected region, or a candidate connected region including a human face in the group of candidate connected regions is determined as the target connected region.

In the embodiments of this application, a candidate connected region including a human face in the group of candidate connected regions is determined as a target connected region. In response to a determination that a plurality of candidate connected regions include a region corresponding to a human face, the plurality of candidate connected regions may all be determined as target connected regions for use as foreground regions. As shown in FIG. 5, there may be a plurality of portraits in the first target image, and regions including a human face in regions that separately correspond to these portraits may all be determined as foreground regions.

Figure 6:
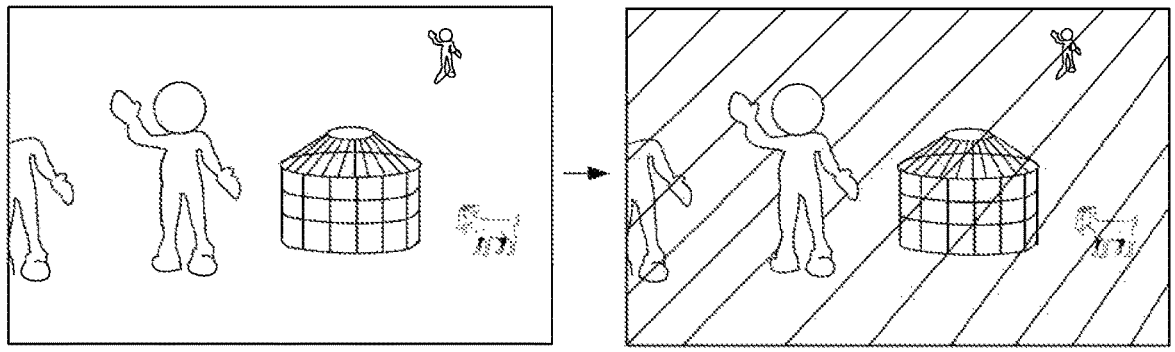
FIG. 6 is a schematic diagram of an image tinder image processing in still another image processing method according to an embodiment of this application.

In the embodiments of this application, in consideration of a situation in which pedestrians may enter the image and these pedestrians are not supposed to be determined as foreground regions, a candidate connected region that has a region area greater than the first threshold and includes a human face in the group of candidate connected regions is determined as a target connected region. As shown in FIG. 6, if a region area of the candidate connected region is less than or equal to the first threshold, the candidate connected region is not determined as the target connected region, so that pedestrians or the like on the far side may be determined as a background region to perform blurring. The first threshold may be set according to system requirements, for example, may be set to one sixth to one fourth of the first target image. The first threshold is positively correlated to the size of the first target image, thereby avoiding that the setting of a fixed value causes the lack of adaptability to images of different sizes. The first threshold may be set to one fixed value.

Further, the determining every connected region in regions in which portrait components are located in the first target image as one candidate connected region, to obtain a group of candidate connected regions includes: setting pixel values of pixels corresponding to the portrait components in the first target image to a first pixel value, and setting pixel values of pixels other than the pixels corresponding to the portrait components in the first target image to a second pixel value, to obtain a binary image, the first pixel value being different from the second pixel value; and performing region recognition on the binary image, to obtain a group of candidate connected regions, the region recognition recognizing a connected region in which pixels with the same pixel value are located in the binary image, pixel values of pixels in one group of candidate connected regions being the first pixel value.

Figure 7:
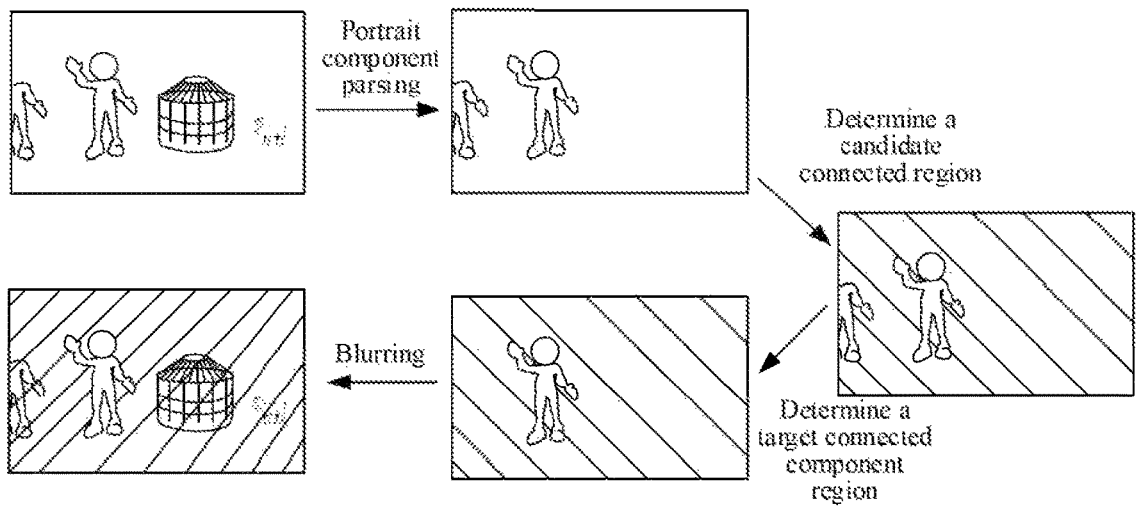
FIG. 7 is a schematic flow chart of still another image processing method according to an embodiment of this application.

In the embodiments of this application, during the determining of a candidate connected region, the first target image may be first binarized, to facilitate region recognition of the binary image to determine a candidate connected region in which a portrait is located. Pixel values of pixels corresponding to portrait components may be set to a first pixel value, and pixel values of pixels other than pixels corresponding to the portrait components are set to a second pixel value, to convert the first target image into the binary image. As shown in FIG. 7, after a portrait component recognition result in the first target image is determined by using the recognition model, the first target image may be binarized according to the portrait component recognition result, to obtain a processed binary image. Subsequently a target candidate region may be determined from a group of candidate connected regions, and the regions other than the target candidate region in the first target image are blurred, to obtain a second target image, to complete the blurring of the background regions, in an embodiment of this application, a manner of connected component detection may be used to perform region recognition.

The following describes the method in the embodiments of this application with reference to FIG. 7. A to-be-processed image I may be inputted into the recognition model. The recognition model may be a deep neural network (DNN). The recognition model parses portrait components in the image I, to obtain a parsing set P=Par(Enc(I)); the portrait components are then parsed to obtain pixels corresponding to portrait components indicated by the portrait component recognition result, and connected component detection is performed on the binarized binary image to obtain a connected region set D={$D_1$, $D_2$ ..., $D_n$}, where $D_1$ represents a pixel set of an $i^{th}$ connected region. Next, a connected region with an area greater than a given threshold (for example, ⅛ of an image area) is added to a candidate connected region set C, where C={$D_i$|sum($D_i$)>⅛ sum(I), $D_i \in D$}, and sum( ) is an area calculation function. After the candidate connected region set is obtained, a region that does include a specified human body position (for example, a human face) or has an area less than a given threshold (for example, ⅕ of an area of a connected set) may be removed from the candidate connected region set, to obtain a foreground region set F, F={$D_i$|sum($D_i \cap P_j \cap$ ... $P_k$)>⅕ sum ($D_i$), $D_i \in C$}, where $P_j \cap$ ... $P_k$ is a pixel set of the specified human body positions, and a background region set is B=U−F, where U is a set formed by all pixels, so that the background regions may be blurred.

Further, before the inputting a to-be-processed first target image into a recognition model, to obtain a portrait recognition result outputted by the recognition model, the method further includes the following methods.

In step S1, a first group of training images, a second group of training images, a group of region division results, and a group of training recognition results are acquired, the first group of training images corresponding one to one to the group of region division results, each region division result representing a known portrait region in an image in the first group of training images, the second group of training images corresponding one to one to the group of training recognition results, each training recognition result representing a known portrait component in an image in the second group of training images.

In step S2, an initial recognition model is trained based on the first group of training images and the second group of training images, to obtain a trained recognition model, an error between an estimated portrait region recognized from the first group of training images by using the trained recognition model and the known portrait region in the group of region division results satisfying a first convergence condition, an error between an estimated portrait component recognized from the second group of training images by using the trained recognition model and the known portrait component in the group of training recognition results satisfying a second convergence condition, the trained recognition model including an encoding network, a portrait region recognition network, and a portrait component recognition network, the encoding network being configured to encode an image to obtain encoded data, the portrait region recognition network being configured to recognize a portrait region according to the encoded data, the portrait component recognition network being configured to recognize a portrait component according to the encoded data.

In step S3, the portrait region recognition network is deleted from the trained recognition model, to obtain the recognition model.

In the embodiments of this application, a first group of training images and a group of region division results that correspond one to one to the first group of training images may be acquired, each region division result in the group of region division results representing a portrait region division result in an image corresponding to the region division result in the first group of training images, a second group of training images and a group of training recognition results that correspond one to one to the second group of training images may be further acquired, each training recognition result in the group of training recognition results representing a portrait component recognition result in an image corresponding to the training recognition result in the second group of training images, so that an initial recognition model is trained by using the first group of training images and the second group of training images.

In the embodiments of this application, the initial recognition model includes an initial encoding network, an initial portrait region recognition network, and an initial portrait component recognition network. The trained recognition model has a trained encoding network; a trained portrait region recognition network, and a trained portrait component recognition network.

In the embodiments of this application, the used recognition model is configured to recognize a portrait component in an inputted image, and a portrait region recognition network is not required. Therefore, the portrait region recognition network in the trained recognition model may be deleted, to obtain the recognition model.

The recognition model with the portrait region recognition network deleted requires a reduced processing amount, so that the recognition efficiency can be improved. In addition, in the embodiments of this application, the portrait region recognition network is set during the training of the initial recognition model, the first group of training images and the group of region division results may be used to increase an amount of training data for the initial recognition model. After an image is inputted, the recognition model first needs to perform encoding by using an encoding network. Therefore, the accuracy of the encoding network can further be effectively improved by using the first group of training images, thereby improving the recognition accuracy of the recognition model obtained through training.

Further, the training an initial recognition model based on the first group of training images and the second group of training images includes, selecting a first training image from the first group of training images, and selecting a second training image from the second group of training images; inputting the first training image and the second training image into the initial recognition model, the initial recognition model including an initial encoding network, an initial portrait region recognition network, and an initial portrait component recognition network, the initial encoding network including cascaded first convolutional layers, the initial portrait region recognition network including cascaded second convolutional layers, the initial portrait component recognition network including cascaded third convolutional layers.

The initial recognition model receives, by a first convolutional layer in the initial encoding network, encoded data obtained after a cascaded previous first convolutional layer encodes the first training image and the second training image, and transmits the encoded data to a corresponding second convolutional layer, third convolutional layer, and cascaded next first convolutional layer. The initial recognition model receives, by the initial portrait region recognition network, encoded data transmitted by a corresponding first convolutional layer and cascaded previous second convolutional layer, and performs a portrait region recognition on the received encoded data. The initial recognition model receives, by the initial portrait component recognition network, encoded data transmitted by a corresponding first convolutional layer and cascaded previous third convolutional layer, and performs a portrait component recognition on the received encoded data.

In the embodiments of this application, after the training of the initial encoding network in the initial recognition model is completed, the encoding network in the trained recognition model is obtained. Similarly, after die training of the initial portrait region recognition network is completed, the portrait region recognition network in the trained recognition model is obtained. A Her the training of the initial portrait component recognition network is completed, the portrait component recognition network in the rained recognition model is obtained.

Figure 8:
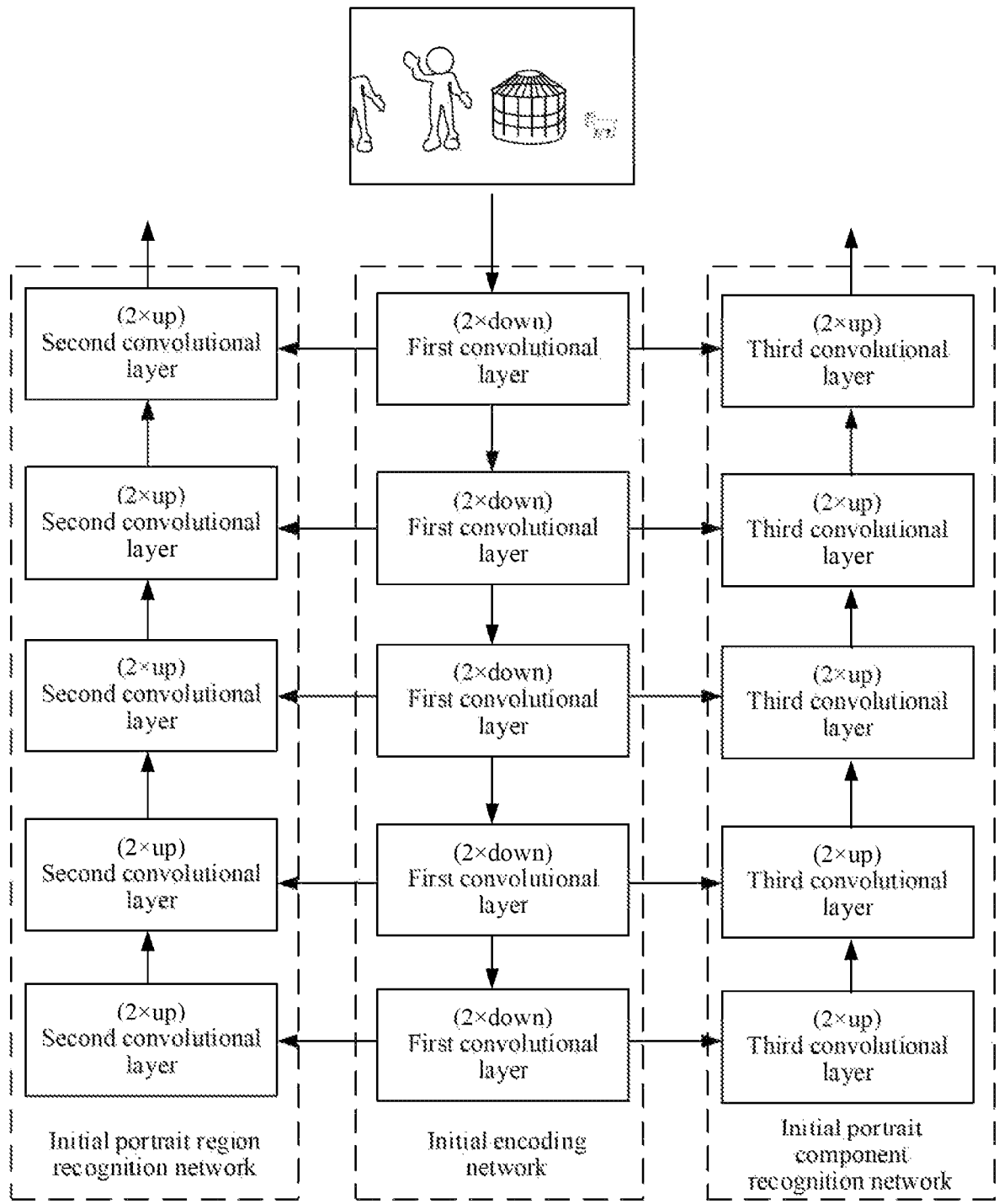
FIG. 8 is a schematic structural diagram of an initial recognition model according to an embodiment of this application.

As shown in FIG. 8, in the embodiments of this application, each network includes a plurality of cascaded convolutional layers. The first convolutional layer that is at the first place in the cascaded first convolutional layers in the initial encoding network encodes an image inputted into the initial recognition model, and the encoded data obtained after encoding is separately transmitted to a cascaded next first convolutional layer, a corresponding second convolutional layer in the initial portrait region recognition network, and a corresponding third convolutional layer in the initial portrait component recognition network. The second convolutional layer in the initial portrait region recognition network receives data outputted by a cascaded previous second convolutional layer and data transferred by a corresponding first convolutional layer, and a third convolutional block in the initial portrait component recognition network receives data outputted by a cascaded previous third convolutional layer and data transferred by a corresponding first convolutional layer.

Figure 9:
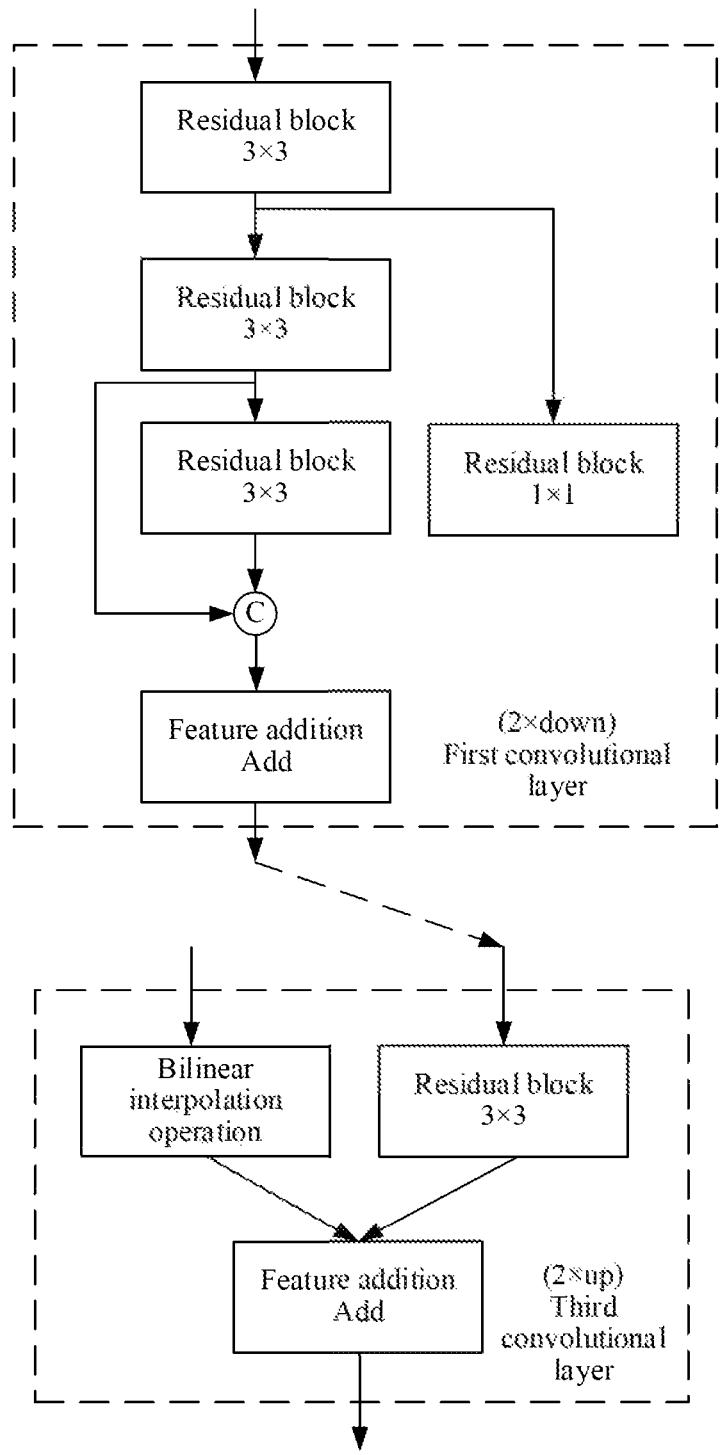
FIG. 9 is a schematic structural diagram of an encoding network according to an embodiment of this application.

In the embodiments of this application, the initial portrait region recognition network and the initial portrait component recognition network respectively perform two tasks, namely, a portrait segmentation task and a portrait component parsing task. While the scale of training data is increased, the initial recognition model can acquire both an overall human body sensing incentive provided by the portrait segmentation task and the partial human body detail sensing incentive provided by portrait component parsing task, thereby improving the performance of the model. As shown in FIG. 9, the first convolutional layer may be a dense convolutional layer. That is, the first convolutional layer may include a plurality of densely connected residual blocks, thereby effectively encoding different scales of the image are, so that features include rich information on different scales.

In the embodiments shown in FIG. 8 and FIG. 9, in this embodiment of this application, the architecture of the trained recognition model is the same as that of the initial recognition model. A difference between the architecture of the recognition model and the architecture of the initial recognition model lies in that there is no portrait region recognition network. Data transmission architectures of the encoding network and the portrait component recognition network are the same as the architectures shown in FIG. 8 and FIG. 9. In the model architecture shown in FIG. 8 and FIG. 9, k×k represents a convolutional operation with a size of a convolutional layer (which may also be referred to as a convolutional kernel) being k×k, C represents the concatenation of feature channels. Add represents the addition of features, and the bilinear interpolation operation Upsample represents a bilinear interpolation operation with an upsampling multiple being 2. As shown in FIG. 9, the first convolutional layer may include a plurality of densely connected residual blocks.

The architecture of the second convolutional layer may be the same as the architecture of the third convolutional layer shown in FIG. 9. An input of the third convolutional layer includes an output of a cascaded previous third convolutional layer and an output of a corresponding first convolutional layer. In the embodiments of this application, the initial portrait region recognition network and the initial portrait component recognition network use similar decoding structures, and features extracted by using the encoding network gradually recover results of portrait segmentation and component parsing from a low scale to a high scale: S=Seg(Enc(I)) and P={$P_1 \cup P_2 \cup \ldots \cup P_k$}=Par(Enc(I)), where I represents an inputted image, S is a pixel set of portrait segmentation, P is parsing set of portrait components, and $P_i$ represents a pixel set of an $i^{th}$ portrait component (for example, a human face). During model training, respectively perform two tasks, namely, a portrait segmentation task and a portrait component parsing task are combined in this embodiment of this application. While the scale of data is increased, the model can acquire both an overall human body sensing incentive provided by the portrait segmentation task and the partial human body detail sensing incentive provided by the portrait component parsing task, thereby improving the performance of the model. In the embodiments of this application, a training loss Loss may be:

$$\text{Loss} = \frac{1}{N} \sum_{I \in HS} CrossEntropy(Seg(Enc(I)), S_{gt}) +$$

$$\frac{1}{M} \sum_{I \in HP} CrossEntropy(Seg(Enc(I)), P_{gt}),$$

where CrossEntropy(.) represents a cross entropy loss, HS represents a portrait segmentation data set, including N training instances, for example, a first group of training images. $S_{gt}$ represents a real portrait segmentation label corresponding to the image I, and may be determined according to a group of region division results, HP represents a portrait component parsing data set, which includes M training instances, for example, a second group of training images, and $P_{gt}$ represents a real portrait component parsing label corresponding to the image I, and may be determined according to a group of portrait segmentation results. When the training loss Loss is less than a set value, it may be considered that currently a convergence condition is satisfied.

The foregoing describes only some embodiments of this application. This application is not limited to the foregoing examples. The recognition model in the embodiments of this application may be a deep neural network (DNN) model, a convolutional neural network (CNN) model or the like in a deep learning-based classification model.

Further, in response to a determination that the first target image is a video frame image in a target video, after the blurring the regions other than the target connected region in the first target image, to obtain a second target image, the method further includes the following steps.

In step S902, the first target image in the target video is replaced with the second target image.

In step S904, the second target image is played in a process of playing the target video.

In the embodiments of this application, the first target image may be a video frame image in a target video, for example, may be an image frame in a video in video conference transmission. After the target video is received, regions other than the target connected region in the first target image in the target video may be blurred, to obtain a second target image, and the first target image in the target video is replaced with the second target image, so that during the playing of a target video, the second target image is played, thereby blurring the background regions and highlighting a person in a video conference.

Gaussian blur may be used in the embodiments of this application to blur the background regions, to obtain blurring results I' and I'=GaussianBlur(I, r)*B+I*F, where GaussianBlur(.) is a Gaussian blur operation, r is a blur kernel radius size (which may be set, for example, to 50). B represents a background region set, and an algebraic operation I*F represents indexing (extracting) elements with a corresponding subscript in I by using F. The foregoing blur is one possible embodiment provided in this application. This application is not limited thereto.

For ease of description, the foregoing method embodiments are stated as a series of action combinations. However, this application is not limited to the described sequence of the actions because according to this application, some steps may use another sequence or may be simultaneously performed. In addition, a person skilled in the art is also to understand that the embodiments described in this specification are all exemplary embodiments, and the involved actions and modules are not necessarily required to this application.

Figure 10:
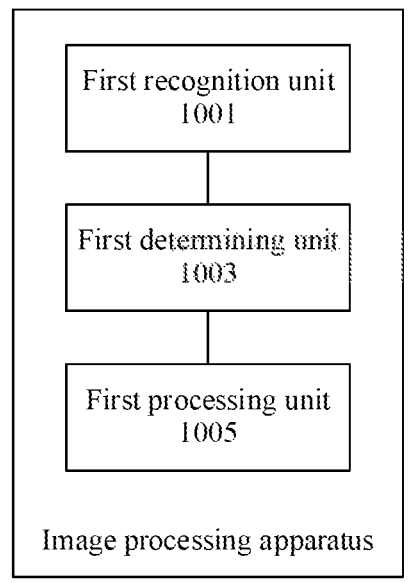
FIG. 10 is a schematic structural diagram of an image processing apparatus according to an embodiment of this application.

According to another aspect of the embodiments of this application, an image processing apparatus configured to implement the foregoing image processing method is further provided. As shown in FIG. 10, the apparatus includes: a first recognition unit 1001, configured to recognize, from a to-be-processed first target image, a plurality of groups of portrait components and a region in which the plurality of groups of portrait components are located, each group of portrait components corresponding to one human body; a first determining unit 1003, configured to determine, in the region in which the plurality of groups of portrait components are located, a target region in which a target group of portrait components is located, the target group of portrait components including a target human face, the target region being separated from regions in which other groups of portrait components other than the target group of portrait components in the plurality of groups of portrait components are located; and a first processing unit 1005, configured to blur the regions other than the target region in the first target image, to obtain a second target image. One or more of the units can be implemented by processing circuitry, software, or a combination thereof for example.

Further, the first determining unit 1003 may include: a first determining module, configured to determine M groups of portrait components including a human face from N groups of portrait components, the N groups of portrait components being the plurality of groups of portrait components, N≥M≥1; and a second determining module, configured to determine, in a region in which the M groups of portrait components are located, the target region in which the target group of portrait components is located, an area of a region in which the human face included in the target group of portrait components is located being greater than or equal to a first threshold, and or, an area of the region in which the target group of portrait components being greater than or equal to a second threshold. One or more of the modules can be implemented by processing circuitry, software, or a combination thereof, for example.

The first threshold and/or the second threshold are positively correlated to a size of the first target image.

Further, the second determining module may include: a setting submodule, configured to: set pixel values of pixels corresponding to the M groups of portrait components to a first pixel value, and set pixel values of pixels other than the pixels corresponding to the M groups of portrait components in the first target image to a second pixel value, to obtain a binary image, the first pixel value being different from the second pixel value, and a processing submodule, configured to perform a region recognition on the binary image, to obtain the target region, the target region including pixels of the target human face. One or more of the submodules can be implemented by processing circuitry, software, or a combination thereof, for example.

In this apparatus embodiment, the first recognition unit 1001 recognizes, from a to-be-processed first target image, a plurality of groups of portrait components and a region in which the plurality of groups of portrait components are located, each group of portrait components corresponding to one human body; the first determining unit 1003 determines, in the region in which the plurality of groups of portrait components are located, a target region in which a target group of portrait components is located, the target group of portrait components including a target human face, the target region being separated from regions in which other groups of portrait components other than the target group of portrait components in the plurality of groups of portrait components are located; and the first processing unit 1005 blurs the regions other than the target region in the first target image, to obtain a second target image. In this way, regions other than the target region are blurred, that is, a target group of portrait components including the human face is recognized from the first target image, so that the target region in which the target group of portrait components is located is determined as a foreground region, and limbs of other people without a human face are determined as a background region, thereby improving the accuracy of recognizing a foreground person and reducing incorrect detection in portrait recognition.

In an embodiment, the apparatus may further include: a replacement unit, configured to replace, in response to a determination that the first target image is a video frame image in a target video, after the first processing unit blurs the regions other titan the target region in the first target image to obtain the second target image, the first target image in the target video with the second target image; and a playing unit, configured to play the second target image in a process of playing the target video. One or more of the units can be implemented by processing circuitry, software, or a combination thereof, for example.

Figure 11:
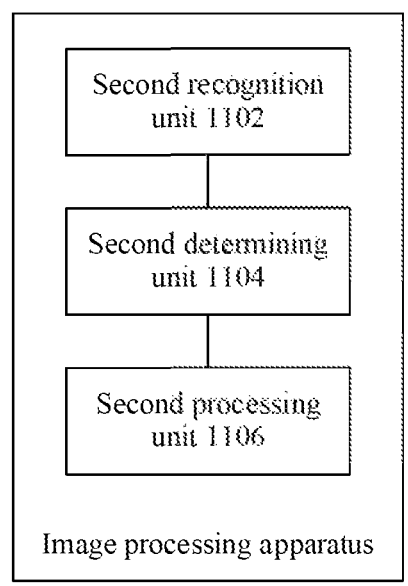
FIG. 11 is a schematic structural diagram of another image processing apparatus according to an embodiment of this application.

According to another aspect of the embodiments of this application, an image processing apparatus configured to implement the foregoing image processing method is further provided. As shown in FIG. 11, the apparatus includes: a second recognition unit 1102, configured to input a to-be-processed first target image into a recognition model, to obtain a portrait recognition result outputted by the recognition model, the recognition model being configured to recognize a portrait component in an image, the portrait recognition result representing the portrait component recognized from the first target image; a second determining unit 1104, configured to determine a target connected region in a region in which the portrait component is located in the first target image, the target connected region including a region in which a human face in the portrait component is located in the first target image; and a second processing unit 1106, configured to blur regions other than the target connected region in the first target image, to obtain a second target image. One or more of the units can be implemented by processing circuitry, software, or a combination thereof, for example.

In the embodiments of this application, the recognition model may recognize portrait components in the inputted image. The portrait components may include, but not limited to, a human face, hair, and a trunk. In the embodiments of this application, because background regions other than a portrait need to be blurred, the image includes a plurality of portrait components. A region obtained by connecting regions in which the plurality of connected portrait components are located is a portrait region. In the embodiments of this application, a connected region including a human face is determined as a target connected region, the target connected region is determined as a foreground region, regions other than the target connected region are determined as background regions, and the background regions other than the target connected region in the first target image are blurred, to obtain the processed second target image. In the embodiments of this application, limbs of other people without a human face are determined as a background region, thereby improving the accuracy of recognizing a foreground person and reducing incorrect detection in portrait recognition.

Further, the second determining unit 1104 includes: a third determining module, configured to determine every connected region in regions in which portrait components are located in the first target image as one candidate connected region, to obtain a group of candidate connected regions; and a fourth determining module, configured to: determine a candidate connected region that has a region area greater than a first threshold and includes a human face in the group of candidate connected regions as the target connected region, or, determine a candidate connected region including a human face in the group of candidate connected regions as the target connected region. One or more of the modules can be implemented by processing circuitry, software, or a combination thereof, for example.

Further, the second threshold is positively correlated to a size of the first target image.

Further, the first determining module is specifically configured to: set pixel values of pixels corresponding to the portrait components in the first target image to a first pixel value, and set pixel values of pixels other than the pixels corresponding to the portrait components in the first target image to a second pixel value, to obtain a binary image, the first pixel value being different from the second pixel value; and perform region recognition on the binary image, to obtain a group of candidate connected regions, the region recognition recognizing a connected region in which pixels with the same pixel value are located in the binary image, pixel values of pixels in one group of candidate connected regions being the first pixel value.

Further, the apparatus may further include: a first acquisition unit, configured to: acquire a first group of training images, a second group of training images, a group of region division results, and a group of training recognition results, the first group of training images corresponding one to one to the group of region division results, each region division result representing a known portrait region in an image in the first group of training images, the second group of training images corresponding one to one to the group of training recognition results, each training recognition result representing a known portrait component in an image in the second group of training images, a training unit, configured to: training an initial recognition model based on the first group of training images and the second group of training images, to obtain a trained recognition model, an error between an estimated portrait region recognized from the first group of training images by using the trained recognition model and the known portrait region in the group of region division results satisfying a first convergence condition, an error between an estimated portrait component recognized from the second group of training images by using the trained recognition model and the known portrait component in the group of training recognition results satisfying a second convergence condition, the trained recognition model including an encoding network, a portrait region recognition network, and a portrait component recognition network, the encoding network being configured to encode an image to obtain encoded data, the portrait region recognition network being configured to recognize a portrait region according to the encoded data, the portrait component recognition network being configured to recognize an estimated portrait component according to the encoded data; and a second processing unit, configured to delete the portrait region recognition network in the trained recognition model, to obtain the recognition model. One or more of the units can be implemented by processing circuitry, software, or a combination thereof, for example.

Further, the training unit includes: an input module, configured to: select a first training image from the first group of training images, and select a second training image from the second group of training images; input the first training image and the second training image into the initial recognition model, the initial recognition model including an initial encoding network, an initial portrait region recognition network, and an initial portrait component recognition network, the initial encoding network including cascaded first convolutional layers, the initial portrait region recognition network including cascaded second convolutional layers, the initial portrait component recognition network including cascaded third convolutional layers; a first convolutional layer in the initial encoding network being configured to: receive encoded data obtained after a cascaded previous first convolutional layer encodes the first training image and the second training image, and transmit the encoded data to a corresponding second convolutional layer, third convolutional layer, and cascaded next first convolutional layer, the initial portrait region recognition network being configured to: receive encoded data transmitted by a corresponding first convolutional layer and cascaded previous second convolutional layer, and perform a portrait region recognition on the received encoded data, the initial portrait component recognition network being configured to: receive encoded data transmitted by a corresponding first convolutional layer and cascaded previous third convolutional layer, and perform a portrait component recognition on the received encoded data. One or more of the modules can be implemented by processing circuitry, software, or a combination thereof, for example.

Figure 12:
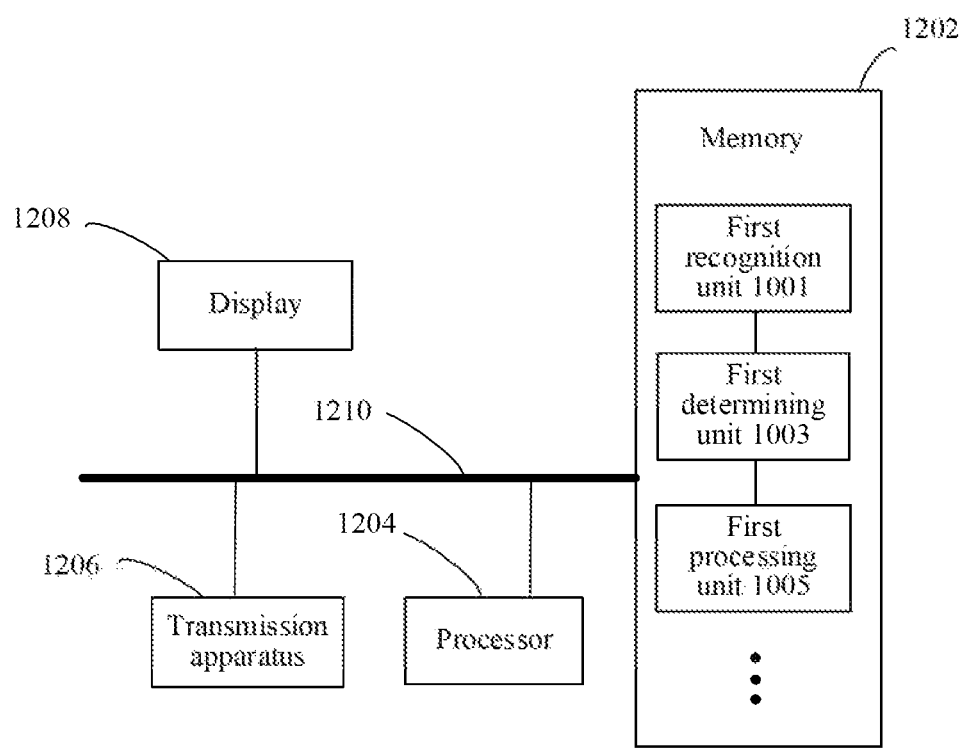
FIG. 12 is a schematic structural diagram of an electronic device according to an embodiment of this application.

According to still another aspect of the embodiments of this application, an electronic device for implementing the image processing method is further provided. As shown in FIG. 12, the electronic device includes a memory 1202 (non-transitory computer-readable storage medium) and a processor 1204 (processing circuitry). The memory 1202 stores a computer program, and the processor 1204 is configured to perform steps in any one of the above method embodiments by using the computer program.

Further, in this embodiment, the electronic device may be located in at least one of a plurality of network devices of a computer network.

Further, in this embodiment, the processor may be configured to perform the following steps through a computer program.

In step S1, a plurality of groups of portrait components and a region in which the plurality of groups of portrait components are located are recognized from a to-be-processed first target image, each group of portrait components corresponding to one human body.

In step S2, a target region in which a target group of portrait components is located is determined in the region in which the plurality of groups of portrait components are located, the target group of portrait components including a target human face, the target region being separated from regions in which other groups of portrait components other than the target group of portrait components in the plurality of groups of portrait components are located.

In step S3, the regions other than the target region in the first target image are blurred, to obtain a second target image.

Further, a person of ordinary skill in the art may understand that the structure shown in FIG. 12 is illustrative. The electronic dev ice may also be a terminal device such as a smartphone (such as an Android mobile phone or an iOS mobile phone), a tablet computer, a palmtop computer, a mobile Internet device (MID), or a PAD. The structure of the foregoing electronic device is not limited in FIG. 12. For example, the electronic device may further include more or fewer components (such as a network interface) than those shown in FIG. 12, or have a configuration different from that shown in FIG. 12.

The memory 1202 may be configured to store a software program and a module, for example, a program instruction/module corresponding to the image processing method and apparatus in the embodiments of this application, and the processor 1204 performs various functional applications and data processing by running the software program and the module stored in the memory 1202, that is, implementing the foregoing image processing method. The memory 1202 may include a high-speed random memory, and may also include a non-volatile memory, for example, one or more magnetic storage apparatuses, a Hash memory, or another non-volatile solid-state memory. In some embodiments, the memory 1202 may further include memories remotely disposed relative to the processor 1204, and the remote memories may be connected to a terminal through a network. Examples of the network include, but are not limited to, the Internet, an intranet, a local area network, a mobile communication network, and a combination thereof. The memory 1202 may be specifically, but not limited to, configured to storage information such as a first target image and a second target image. In an example, as shown in FIG. 12, the memory 1202 may include, but is not limited to, the first recognition unit 1001, the first determining unit 1003, and the first processing unit 1005 in the foregoing image processing apparatus. In addition, the memory may further include, but is not limited to, other modules or units in the foregoing image processing apparatus, and details are not described in this example again.

Further, a transmission device 1206 is configured to receive or send data through a network. Specific instances of the foregoing network may include a wired network and a wireless network. In an example, the transmission device 1206 includes a network interface controller (NIC). The NIC may be connected to another network device and a router by using a network cable, to communicate with the Internet or a local area network. In an example, the transmission device 1206 is a radio frequency (RF) module, which communicates with the Internet in a wireless manner.

In addition, the foregoing electronic device further includes: a display 1208, configured to display the first target image and the second target image; and a connection bus 1210, configured to connect various module components in the foregoing electronic device.

According to still another aspect of the embodiments of this application, a computer-readable storage medium is further provided. The computer-readable storage medium stores a computer program, the computer program being configured to perform, when run, steps in any one of the foregoing method embodiments.

Further, in this embodiment, the computer-readable storage medium may be configured to store a computer program for performing the following steps.

In step S1, a plurality of groups of portrait components and a region in which the plurality of groups of portrait components are located are recognized from a to-be-processed first target image, each group of portrait components corresponding to one human body.

In step S2, a target region in which a target group of portrait components is located is determined in the region in which the plurality of groups of portrait components are located, the target group of portrait components including a target human face, the target region being separated from regions in which oilier groups of portrait components other than the target group of portrait components in the plurality of groups of portrait components are located.

In step S3, the regions other than the target region in the first target image are blurred, to obtain a second target image.

Further, in this embodiment, a person of ordinary skill in the art may understand that all or some of the steps of the methods in die foregoing embodiments may be implemented by a program instructing relevant hardware of the terminal device. The program may be stored in a computer-readable storage medium. The storage medium may include a Hash disk, a read-only memory (ROM), a random access memory (RAM), a magnetic disc, an optical disk, and the like.

The sequence numbers of the foregoing embodiments of this application are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of the steps of the methods in the embodiments of this application.

In the foregoing embodiments of this application, the descriptions of the embodiments have respective focuses. For a pan that is not described in detail in an embodiment, reference may be made to related descriptions in other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications fall within the protection scope of this application.

What is claimed is:

1. An image processing method comprising:
  recognizing, from a first image, a plurality of groups of portrait components and a region in which the plurality of groups of portrait components are located, each group of portrait components corresponding to one human body;
  determining, by processing circuitry of an electronic device, in the recognized region in which the plurality of groups of portrait components are located, which of the plurality of groups of portrait components includes a respective human face; determining a target region in the recognized region that is separated from other regions in the recognized region based on which of the plurality of groups of portrait components is determined to include the respective human face, the target region including each of the plurality of groups of portrait components that includes the respective human face; and
  blurring regions of the first image other than the target region, to obtain a second image.

2. The method according to claim 1, wherein the determining the target region comprises:
  determining M groups of portrait components comprising a human face from N groups of portrait components, the N groups of portrait components being the plurality of groups of portrait components, $N \geq M \geq 1$; and
  determining, in a region in which the M groups of portrait components are located, the target region in which the respective human face of each of the plurality of groups of portrait components including the respective human face is located is larger than or equal to a first threshold, or the target region in which each of the plurality of groups of portrait components including the respective human face is located being larger than or equal to a second threshold.

3. The method according to claim 2, wherein the first threshold and the second threshold are positively correlated to a size of the first image.

4. The method according to claim 2, wherein the determining, in the region in which the M groups of portrait components are located, comprises:
setting pixel values of pixels corresponding to the M groups of portrait components to a first pixel value, and setting pixel values of pixels in the first image other than the pixels corresponding to the M groups of portrait components to a second pixel value, to obtain a binary image, the first pixel value being different from the second pixel value; and
performing a region recognition on the binary image, to obtain the target region, the target region comprising pixels of the respective human face of each of the plurality of groups of portrait components determined to include the respective human face.

5. The method according to claim 1, wherein the recognizing comprises:
processing the first image by using a recognition model, and determining the plurality of groups of portrait components and the recognized region in which the plurality of groups of portrait components are located.

6. The method according to claim 1, wherein, before the recognizing, the method further comprises:
acquiring a first group of training images, a second group of training images, a group of region division results, and a group of training recognition results, the first group of training images corresponding one to one to the group of region division results, each region division result representing a known portrait region in an image in the first group of training images, the second group of training images corresponding one to one to the group of training recognition results, each training recognition result representing a known portrait component in an image in the second group of training images; and
training an initial recognition model based on the first group of training images and the second group of training images, to obtain a trained recognition model, an error between an estimated portrait region recognized from the first group of training images by using the trained recognition model and the known portrait region in the group of region division results satisfying a first convergence condition, an error between an estimated portrait component recognized from the second group of training images by using the trained recognition model and the known portrait component in the group of training recognition results satisfying a second convergence condition,
the trained recognition model comprising:
an encoding network configured to encode an image to obtain encoded data,
a portrait region recognition network configured to recognize a portrait region according to the encoded data, and
a portrait component recognition network configured to recognize a portrait component according to the encoded data.

7. The method according to claim 6, wherein the training comprises:

selecting a first training image from the first group of training images, and selecting a second training image from the second group of training images;
inputting the first training image and the second training image into the initial recognition model, the initial recognition model comprising an initial encoding network, an initial portrait region recognition network, and an initial portrait component recognition network, the initial encoding network comprising cascaded first convolutional layers, the initial portrait region recognition network comprising cascaded second convolutional layers, the initial portrait component recognition network comprising cascaded third convolutional layers; and
receiving, by a first convolutional layer in the initial encoding network, encoded data obtained after a cascaded previous first convolutional layer encodes the first training image and the second training image, and transmitting the encoded data to a corresponding second convolutional layer, third convolutional layer, and cascaded next first convolutional layer;
receiving, by the initial portrait region recognition network, encoded data transmitted by a corresponding first convolutional layer and cascaded previous second convolutional layer, and performing a portrait region recognition on the received encoded data; and
receiving, by the initial portrait component recognition network, encoded data transmitted by a corresponding first convolutional layer and cascaded previous third convolutional layer, and performing a portrait component recognition on the received encoded data.

8. The method according to claim 1, wherein, in response to a determination that the first image is a video frame image in a video, after the blurring the regions other than the target region in the first image, the method further comprises:
replacing the first image in the video with the second image; and
playing the second image in a process of playing the video.

9. An image processing apparatus, comprising:
processing circuitry configured to
recognize, from a first image, a plurality of groups of portrait components and a region in which the plurality of groups of portrait components are located, each group of portrait components corresponding to one human body;
determine, in the recognized region in which the plurality of groups of portrait components are located, which of the plurality of groups of portrait components includes a respective human face;
determine a target region in the recognized region that is separated from other regions in the recognized region based on which of the plurality of groups of portrait components is determined to include the respective human face, the target region including each of the plurality of groups of portrait components that includes the respective human face; and
blur regions of the first image other than the target region, to obtain a second image.

10. The apparatus according to claim 9, wherein the processing circuitry performs the determining by:
determining M groups of portrait components from N groups of portrait components, the N groups of portrait components being the plurality of groups of portrait components, $N \geq M \geq 1$; and
determining, in a region in which the M groups of portrait components are located, the target region in which the respective human face of each of the plurality of groups of portrait components including the respective human face is located is larger than or equal to a first threshold, or, the target region in which the plurality of groups of portrait components including the respective human face is located being larger than or equal to a second threshold.

11. The apparatus according to claim 10, wherein the first threshold and the second threshold is positively correlated to a size of the first image.

12. The apparatus according to claim 10, wherein the processing circuitry is configured to determine the target region by:
    setting pixel values of pixels corresponding to the M groups of portrait components to a first pixel value, and setting pixel values of pixels in the first image other than the pixels corresponding to the M groups of portrait components to a second pixel value, to obtain a binary image, the first pixel value being different from the second pixel value; and
    performing a region recognition on the binary image, to obtain the target region, the target region comprising pixels of the respective human face of each of the plurality of groups of portrait components determined to include the respective human face.

13. The apparatus according to claim 9, wherein the processing circuitry is configured to recognize the plurality of groups of portrait components by:
    processing the first image by using a recognition model, and determining the plurality of groups of portrait components and the recognized region in which the plurality of groups of portrait components are located.

14. The apparatus according to claim 9, wherein, before recognizing the plurality of groups of portrait components, the processing circuitry is further configured to:
    acquire a first group of training images, a second group of training images, a group of region division results, and a group of training recognition results, the first group of training images corresponding one to one to the group of region division results, each region division result representing a known portrait region in an image in the first group of training images, the second group of training images corresponding one to one to the group of training recognition results, each training recognition result representing a known portrait component in an image in the second group of training images; and
    train an initial recognition model based on the first group of training images and the second group of training images, to obtain a trained recognition model, an error between an estimated portrait region recognized from the first group of training images by using the trained recognition model and the known portrait region in the group of region division results satisfying a first convergence condition, an error between an estimated portrait component recognized from the second group of training images by using the trained recognition model and the known portrait component in the group of training recognition results satisfying a second convergence condition,
    the trained recognition model comprising:
        an encoding network configured to encode an image to obtain encoded data,
        a portrait region recognition network configured to recognize a portrait region according to the encoded data, and
        a portrait component recognition network configured to recognize a portrait component according to the encoded data.

15. The apparatus according to claim 14, wherein the processing circuitry is configured to train the initial recognition model by:
    selecting a first training image from the first group of training images, and selecting a second training image from the second group of training images;
    inputting the first training image and the second training image into the initial recognition model, the initial recognition model comprising an initial encoding network, an initial portrait region recognition network, and an initial portrait component recognition network, the initial encoding network comprising cascaded first convolutional layers, the initial portrait region recognition network comprising cascaded second convolutional layers, the initial portrait component recognition network comprising cascaded third convolutional layers; and
    receiving, by a first convolutional layer in the initial encoding network, encoded data obtained after a cascaded previous first convolutional layer encodes the first training image and the second training image, and transmitting the encoded data to a corresponding second convolutional layer, third convolutional layer, and cascaded next first convolutional layer;
    receiving, by the initial portrait region recognition network, encoded data transmitted by a corresponding first convolutional layer and cascaded previous second convolutional layer, and performing a portrait region recognition on the received encoded data; and
    receiving, by the initial portrait component recognition network, encoded data transmitted by a corresponding first convolutional layer and cascaded previous third convolutional layer, and performing a portrait component recognition on the received encoded data.

16. The apparatus according to claim 9, wherein, in response to a determination that the first image is a video frame image in a video and after blurring the regions other than the target region in the first image, the processing circuitry is further configured to:
    replace the first image in the video with the second image; and
    play the second image in a process of playing the video.

17. A non-transitory computer-readable storage medium storing computer-readable instructions thereon, which, when executed by a processor, cause the processor to perform an image processing method comprising:
    recognizing, from a first image, a plurality of groups of portrait components and a region in which the plurality of groups of portrait components are located, each group of portrait components corresponding to one human body;
    determining, by processing circuitry of an electronic device, in the recognized region in which the plurality of groups of portrait components are located, which of the plurality of groups of portrait components includes a respective human face;
    determining a target region in the recognized region that is separated from other regions in the recognized region based on which of the plurality of groups of portrait components is determined to include the respective human face, the target region including each of the plurality of groups of portrait components that includes the respective human face; and blurring regions of the first image other than the target region, to obtain a second image.

18. The non-transitory computer-readable storage medium according to claim 17, wherein the determining comprises:

determining M groups of portrait components from N groups of portrait components, the N groups of portrait components being the plurality of groups of portrait components, N≥M≥1; and determining, in a region in which the M groups of portrait components are located, the target region in which the respective human face of each of the plurality of groups of portrait components including the respective human face is located is larger than or equal to a first threshold, or the target region in which the plurality of groups of portrait components including the respective human face is located being larger than or equal to a second threshold.

19. The non-transitory computer-readable storage medium according to claim 18, wherein the first threshold and the second threshold are positively correlated to a size of the first image.

20. The non-transitory computer-readable storage medium according to claim 18, wherein the determining, in the region in which the M groups of portrait components are located, comprises:

setting pixel values of pixels corresponding to the M groups of portrait components to a first pixel value, and setting pixel values of pixels in the first image other than the pixels corresponding to the M groups of portrait components to a second pixel value, to obtain a binary image, the first pixel value being different from the second pixel value; and performing a region recognition on the binary image, to obtain the target region, the target region comprising pixels of the respective human face of each of the plurality of groups of portrait components determined to include the respective human face.

* * * * *